US009955629B2

(12) United States Patent
Vandevelde et al.

(10) Patent No.: US 9,955,629 B2
(45) Date of Patent: May 1, 2018

(54) AGRICULTURAL HARVESTER WITH IMPROVED ELEVATOR GEOMETRY

(71) Applicant: CNH Industrial America LLC, New Holland, PA (US)

(72) Inventors: Pieter Vandevelde, Sint Michiels Brugge (BE); Eric E. Veikle, Lititz, PA (US)

(73) Assignee: CNH Industrial America LLC, New Holland, PA (US)

( * ) Notice: Subject to any disclaimer, the term of this patent is extended or adjusted under 35 U.S.C. 154(b) by 306 days.

(21) Appl. No.: 14/791,288

(22) Filed: Jul. 3, 2015

(65) Prior Publication Data
US 2017/0000033 A1     Jan. 5, 2017

(51) Int. Cl.
*A01F 12/46*     (2006.01)
*A01D 61/04*     (2006.01)
*A01D 61/00*     (2006.01)

(52) U.S. Cl.
CPC ............ *A01F 12/46* (2013.01); *A01D 61/008* (2013.01); *A01D 61/04* (2013.01)

(58) Field of Classification Search
CPC ......... A01F 12/46; A01F 12/52; A01D 17/04; A01D 61/008; A01D 61/04; A01D 61/00
USPC ......................................... 460/114, 116, 119
See application file for complete search history.

(56) References Cited

U.S. PATENT DOCUMENTS

| 1,382,901 A | * | 6/1921 | Gebhardt | A01F 12/52 209/257 |
| 1,666,985 A | * | 4/1928 | Ayotte | A01F 12/46 292/113 |
| 1,723,481 A | * | 8/1929 | Hartley | A01F 12/46 198/861.4 |
| 2,252,460 A | | 8/1941 | Sinden | |
| 2,293,554 A | | 8/1942 | May | |
| 2,488,671 A | | 11/1949 | Lehman | |
| 3,643,826 A | | 2/1972 | Weakly | |
| 3,687,272 A | | 8/1972 | Eisenegger | |
| 4,373,537 A | * | 2/1983 | McNaught | A01F 12/44 241/190 |
| 4,800,902 A | * | 1/1989 | Maust | A01D 41/1208 460/114 |
| 4,850,304 A | * | 7/1989 | Nicholson | B01F 5/241 118/310 |

(Continued)

FOREIGN PATENT DOCUMENTS

| DE | 1022835 B | * | 1/1958 | ............. A01F 12/46 |
| DE | 102008023022 A1 | * | 11/2009 | ......... A01D 41/1208 |

(Continued)

*Primary Examiner* — Thomas B Will
*Assistant Examiner* — Joan D Misa
(74) *Attorney, Agent, or Firm* — Patrick M. Sheldrake

(57) ABSTRACT

An agricultural harvester includes a chassis; a cleaning system carried by the chassis and is configured to clean crop material; and a crop material elevator carried by the chassis that is supplied with cleaned crop material from the cleaning system. The crop material elevator includes: a housing including a boot portion at a bottom of the housing, the boot portion defining a bulbous shape on at least a conveyance side of the housing; a driving loop held within the housing and configured to rotate; a driving element linked to the driving loop and configured to rotate the driving loop; and a plurality of paddles carried by the driving loop.

20 Claims, 6 Drawing Sheets

(56) References Cited

U.S. PATENT DOCUMENTS

| | | | |
|---|---|---|---|
| 5,007,561 A | 4/1991 | Wahl et al. | |
| 5,853,112 A | 12/1998 | Coleman et al. | |
| 5,863,247 A * | 1/1999 | Behnke | G01G 11/00 |
| | | | 460/114 |
| 6,350,197 B1 | 2/2002 | Cooksey et al. | |
| 7,690,973 B2 * | 4/2010 | Becker | A01F 12/46 |
| | | | 460/114 |
| 7,833,091 B2 * | 11/2010 | Holtmann | A01D 41/12 |
| | | | 460/114 |
| 8,007,353 B1 * | 8/2011 | Werning | A01F 12/46 |
| | | | 460/13 |
| 8,801,514 B1 | 8/2014 | McCully et al. | |
| 2016/0316627 A1 * | 11/2016 | Brockel | A01D 61/00 |

FOREIGN PATENT DOCUMENTS

| | | | |
|---|---|---|---|
| EP | 3072383 A1 * | 9/2016 | ............ A01F 12/46 |
| EP | 3111744 A1 * | 1/2017 | .......... A01D 61/008 |
| FR | 2 755 955 A1 | 5/1998 | |

* cited by examiner

AGRICULTURAL HARVESTER WITH IMPROVED ELEVATOR GEOMETRY

BACKGROUND OF THE INVENTION

1. Field of the Invention

The present invention relates to agricultural harvesters, and, more particularly, to crop material elevators.

2. Description of the Related Art

Combines are used to harvest agricultural crops such as corn, soybeans, wheat and other grain crops. As the combine is driven through crop fields, the combine cuts the crop, separates the desired crop from the undesired waste, stores the crop, and discards the waste.

In a typical combine, a header is mounted to the front of the combine to gather the crop and feed the crop into the combine for processing. As the combine is driven through the field, the crop material is collected by the header and deposited into a feeder housing. The crop material is then transported upwardly and into the combine by a feed elevator located within the feeder housing. The crop material then passes through a threshing and separating mechanism. In a rotary combine, the threshing and separating mechanism includes a rotor, a threshing concave, a rotor cage, and a separating grate. As crop material passes between the rotor, the threshing concave and the separating grate, the crop material is impacted and/or rubbed, thereby causing the grain to separate from the stalk material. The stalk material that is separated from the grain is commonly referred to as material other than grain (MOG). Other types of combines are also known that perform similar functions using different mechanisms.

After passing through the threshing and separating assembly, the grain and MOG are deposited onto a grain cleaning system. The grain cleaning system of a typical combine includes a plurality of adjustable cleaning sieves, often referred to as a chaffer sieve and a shoe sieve. The sieves are typically reciprocated back and forth in opposite directions along an arcuate path. This motion has the tendency to separate the grain from the MOG. To further separate the grain from the MOG, a cleaning fan or blower is positioned so as to blow air up through the cleaning sieves. This flow of air tends to blow the MOG, which is typically lighter than grain, rearwardly and out the back of the combine. Grain, which is heavier than MOG, is allowed to drop through the openings in the sieve.

The clean grain that falls through the cleaning sieves is deposited on a collection panel positioned beneath the cleaning sieves. The collection panel is angled so as to permit the grain to flow, under the influence of gravity, into an auger trough positioned along the lowermost edge of the collection panel. The auger trough is typically positioned near the forward end of the cleaning sieves and extends along the width of the sieves. The grain collected in the auger trough is then moved by an auger towards the side of the combine where it is raised by a grain elevator and deposited into a storage tank or grain tank. Other systems also exist that can utilize, for example, a loop conveyor system which eliminates the need for a conventional cross auger.

During transportation of cleaned crop material through the elevator, peak loads are exerted on paddles of the elevator when the paddles travel through head and boot portions of the elevator. The peak loads are due to maximal acceleration forces that arise as the paddles transition from a linear motion to a rotational motion to switch between upward and downward movement in the elevator. These peak loads are transmitted through the paddles to a driving loop of the elevator, which can be a chain or other similar construction. The peak loads decrease the life of the elevator chain and result in accelerated wear rates in the head and boot portion. Previous attempts to reduce these peak loads have focused on increasing the clearance between the paddles of the elevator and a bottom of the boot portion, allowing a grain layer to form between the boot portion and paddles. While this modification may reduce the loads exerted on the paddles, the peak loads exerted on the paddles are still relatively high and the modification also increases the possibility for grain being left in the elevator that can stagnate. Another modification to decrease the peak loads on the driving loop has involved symmetrically increasing the clearance between the boot portion and the paddles. This modification sacrifices ground clearance to reduce the peak loads on the driving loop to a level that is still relatively high.

What is needed in the art is a crop material elevator that experiences lowered peak loads on the paddles and overcomes some of the previously described disadvantages.

SUMMARY OF THE INVENTION

The present invention provides a crop material elevator with a housing having a boot portion that defines a bulbous shape on at least a conveyance side of the housing.

The invention in one form is directed to an agricultural harvester that includes a chassis; a cleaning system carried by the chassis and is configured to clean crop material; and a crop material elevator carried by the chassis that is supplied with cleaned crop material from the cleaning system. The crop material elevator includes: a housing including a boot portion at a bottom of the housing, the boot portion defining a bulbous shape on at least a conveyance side of the housing; a driving loop held within the housing and configured to rotate; a driving element linked to the driving loop and configured to rotate the driving loop; and a plurality of paddles carried by the driving loop.

The invention in another form is directed to a crop material elevator including: a housing including a boot portion at a bottom of the housing, the boot portion defining a bulbous shape on at least one side of the housing; a driving loop held within the housing and configured to rotate; a driving element linked to the driving loop and configured to rotate the driving loop; and a plurality of paddles carried by the driving loop.

The invention in yet another form is directed to an agricultural harvester that includes a chassis; a cleaning system carried by the chassis and is configured to clean crop material; and a crop material elevator carried by the chassis that is supplied with cleaned crop material from the cleaning system. The crop material elevator includes: a driving loop configured to rotate; a driving element linked to the driving loop and configured to rotate the driving loop; a plurality of paddles carried by the driving loop, the plurality of paddles each being carried by the driving loop to define a travel path with a rotational component that transitions into a linear component; and a housing at least partially surrounding the driving loop and the plurality of paddles. The housing has a region of divergence relative to the driving loop adjacent to the rotational component of the travel path and a region of convergence relative to the driving loop adjacent to the linear component of the travel path.

An advantage of the present invention is the bulbous shape of the boot portion allows the cleaned crop material to decelerate before being carried up the housing by the paddles, reducing wear on the driving loop and boot portion.

Another advantage is the cleaned crop material experiences less damage from the impact with the paddles.

Yet another advantage is the peak loads on the driving loop can be reduced in different shaped crop material elevators.

Yet another advantage is the crop material elevator of the present invention can have a higher ground clearance compared to elevators that symmetrically increase the clearance between the boot portion and the paddles throughout the boot portion.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one embodiment of the invention and such exemplification is not to be construed as limiting the scope of the invention in any manner.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Figure 1:
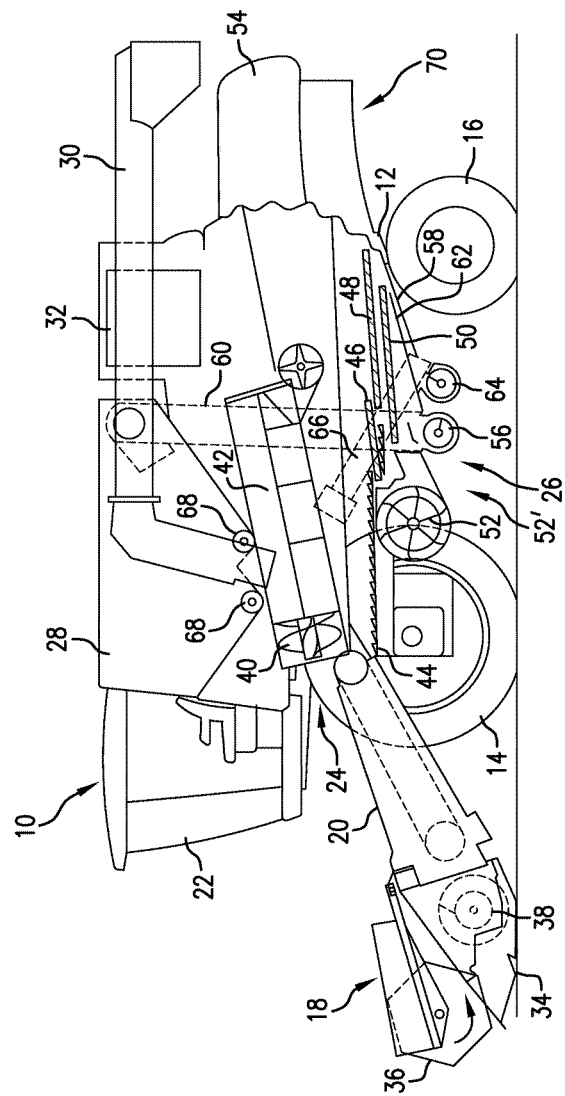
FIG. 1 is a side view of an embodiment of an agricultural harvester formed according to the present invention.

Referring now to the drawings, and more particularly to FIG. 1, there is shown an agricultural harvester in the form of a combine 10, which generally includes a chassis 12, ground engaging wheels 14 and 16, a header 18, a feeder housing 20, an operator cab 22, a threshing and separating system 24, a cleaning system 26, a grain tank 28, and an unloading auger 30. It should be appreciated that while the agricultural harvester is shown as combine 10, the agricultural harvester according to the present invention can be any type of construction that allows for crop material to be harvested such as a conventional combine (which does not have a rotor), rotary combine, hybrid combine, chopper harvester, etc.

Front wheels 14 are larger flotation type wheels, and rear wheels 16 are smaller steerable wheels. Motive force is selectively applied to front wheels 14 through a power plant in the form of a diesel engine 32 and a transmission (not shown). Although combine 10 is shown as including wheels, is also to be understood that combine 10 may include tracks, such as full tracks or half tracks.

Header 18 is mounted to the front of combine 10 and includes a cutter bar 34 for severing crops from a field during forward motion of combine 10. A rotatable reel 36 feeds the crop into header 18, and a double auger 38 feeds the severed crop laterally inwardly from each side toward feeder housing 20. Feeder housing 20 conveys the cut crop to threshing and separating system 24, and is selectively vertically movable using appropriate actuators, such as hydraulic cylinders (not shown).

Threshing and separating system 24 is of the axial-flow type, and generally includes a rotor 40 at least partially enclosed by and rotatable within a corresponding perforated concave 42. The cut crops are threshed and separated by the rotation of rotor 40 within concave 42, and larger elements, such as stalks, leaves and the like are discharged from the rear of combine 10. Smaller elements of crop material including grain and non-grain crop material, including particles lighter than grain, such as chaff, dust and straw, are discharged through perforations of concave 42.

Grain which has been separated by the threshing and separating assembly 24 falls onto a grain pan 44 and is conveyed toward cleaning system 26. Cleaning system 26 may include an optional pre-cleaning sieve 46, an upper sieve 48 (also known as a chaffer sieve), a lower sieve 50 (also known as a shoe sieve), and a cleaning fan 52. Grain on sieves 46, 48 and 50 is subjected to a cleaning action by fan 52 which provides an airflow through the sieves to remove chaff and other impurities such as dust from the grain by making this material airborne for discharge from straw hood 54 of combine 10. Grain pan 44 and pre-cleaning sieve 46 oscillate in a fore-to-aft manner to transport the grain and finer non-grain crop material to the upper surface of upper sieve 48. Upper sieve 48 and lower sieve 50 are vertically arranged relative to each other, and likewise oscillate in a fore-to-aft manner to spread the grain across sieves 48, 50, while permitting the passage of cleaned grain by gravity through the openings of sieves 48, 50.

Clean grain falls to a clean grain auger 56 positioned crosswise below and in front of lower sieve 50. Clean grain auger 56 receives clean grain from each sieve 48, 50 and from bottom pan 62 of cleaning system 26. Clean grain auger 56 conveys the clean grain laterally to a generally vertically arranged elevator 60, which can also be referred to as a grain elevator, for transport to grain tank 28. Tailings from cleaning system 26 fall to a tailings auger on 58. The tailings are transported via tailings auger 64 and return auger 66 to the upstream end of cleaning system 26 for repeated cleaning action. A pair of grain tank augers 68 at the bottom of grain tank 28 convey the clean grain laterally within grain tank 28 to unloading auger 30 for discharge from combine 10.

The non-grain crop material proceeds through a residue handling system 70. Residue handling system 70 may include a chopper, counter knives, a windrow door and a residue spreader.

Figure 2:
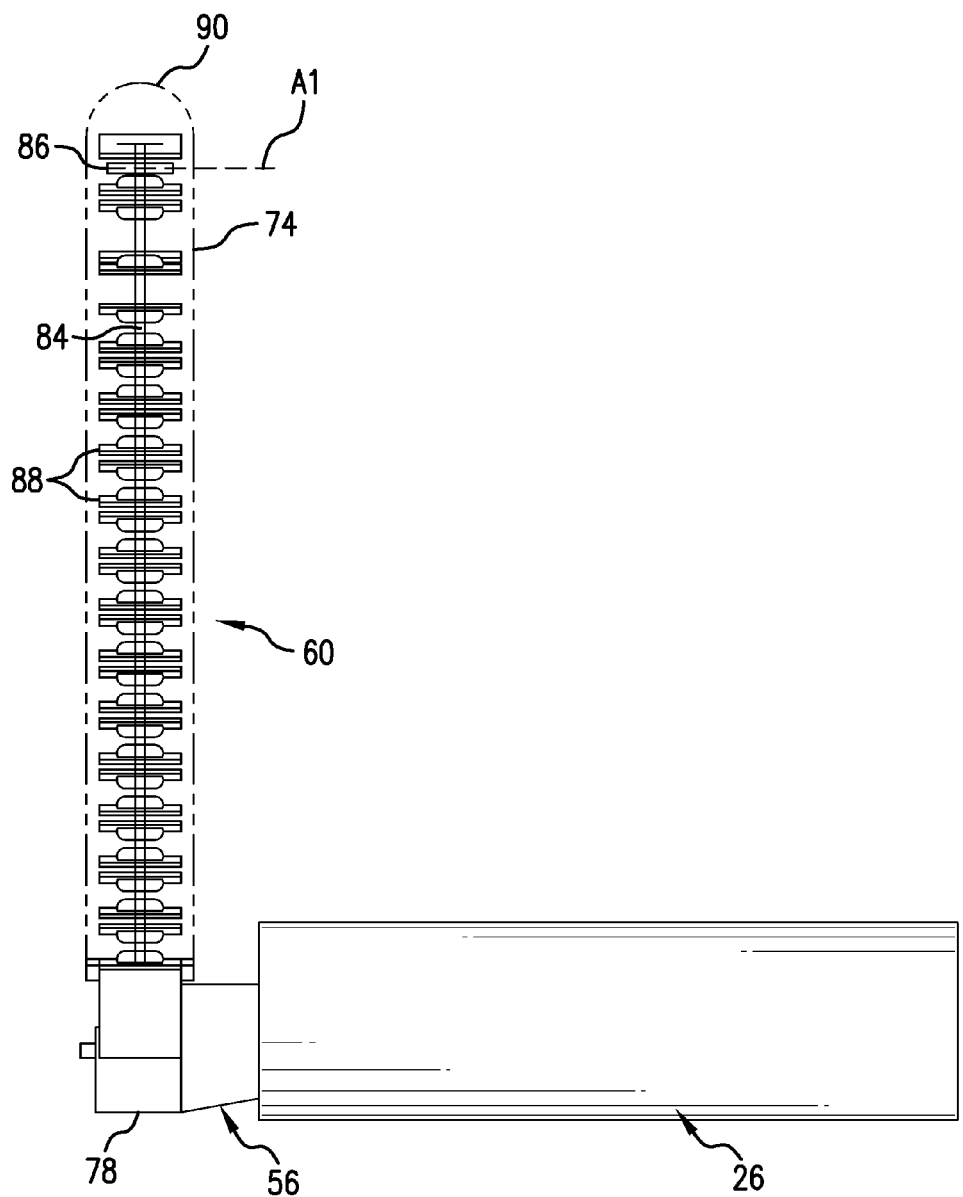
FIG. 2 is a front view of an embodiment of a cleaning system and crop material elevator shown in FIG. 1.

Referring now to FIG. 2, a portion of the agricultural harvester 10 with the cleaning system 26 and an embodiment of the crop material elevator 60 is shown in better detail. As can be seen, crop material is supplied to the crop material elevator 60 from the cleaning system 26, which is shown generically as a block to illustrate that any sort and portion of a cleaning system can supply crop material to the crop material elevator 60. The crop material can be supplied into one or more inlets of the crop material elevator 60 utilizing any desired mechanism, such as clean grain auger 56. It should be appreciated that the crop material elevator 60 can be supplied with crop material from more than one auger, as shown in FIGS. 3-4, or a mechanism besides an auger, depending on the configuration of the cleaning system.

As can be seen, the crop material elevator 60 includes a housing 74 with a boot portion 78 at a bottom of the housing 74. A driving loop 84 is held within the housing 74 and can be rotated by one or more driving elements 86, shown as rotating sprockets, to carry paddles 88 through the housing 74. The driving loop 84 can be any type of element, such as a chain, that can be rotated by the driving element(s) 86 to carry the paddles 88 through the housing 74. The sprockets 86 can therefore define an axis of rotation A1 that the driving loop 84 rotates about to carry the paddles 88. As the paddles 88 are carried through the housing 74 by the driving loop 84, crop material moved into the housing 74 from the cleaning system 26 can be swept up by the paddles 88 and carried from the boot portion 78, where the paddles 88 transition from a generally downward motion to a generally upward motion, toward a top 90 of the housing 74, where the crop material can be transported to the grain tank 28.

Figure 3:
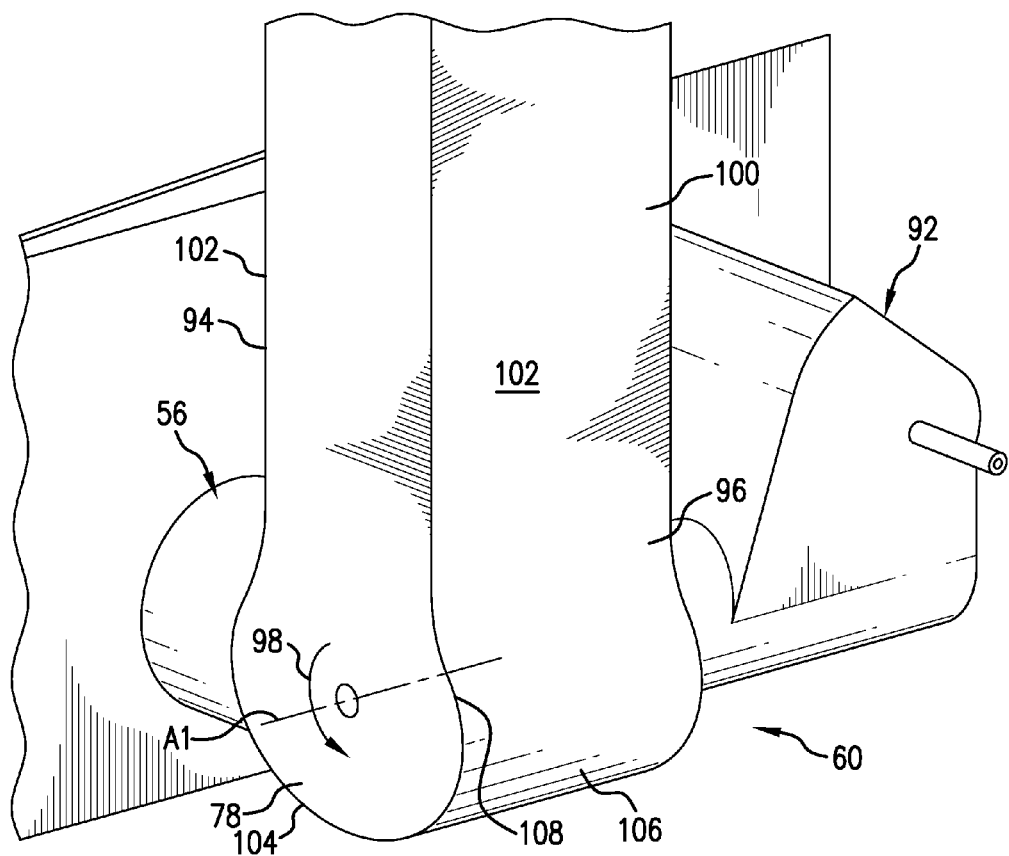
FIG. 3 is a perspective view of the crop material elevator shown in FIGS. 1-2.
Figure 4:
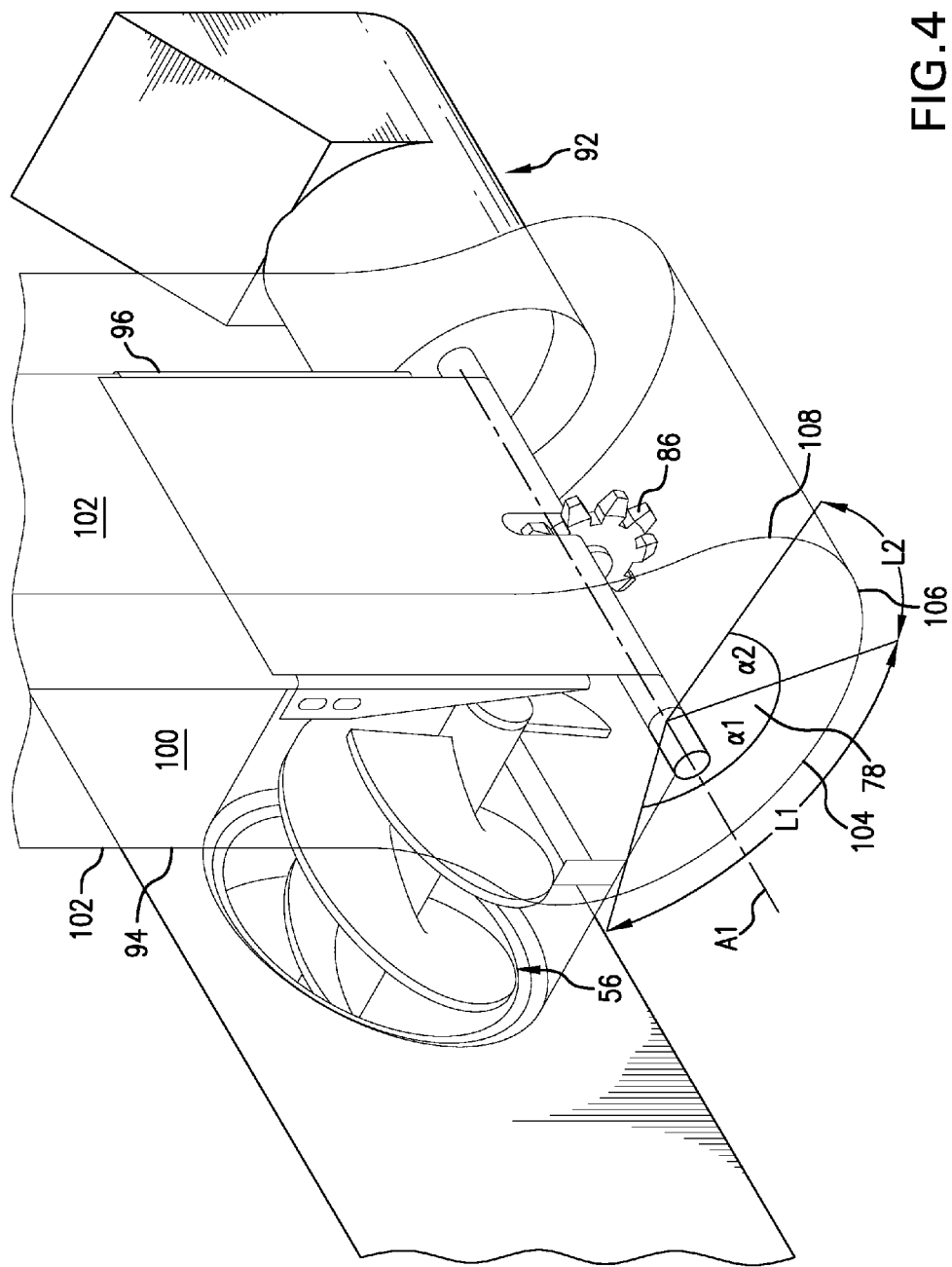
FIG. 4 is a partial cut-away perspective view of the crop material elevator shown in FIGS. 1-3.

Referring now to FIGS. 3-4, the crop material elevator 60 is shown being supplied with cleaned crop material from the clean grain auger 56 as well as an additional auger 92. By having the crop material elevator 60 supplied with clean crop material from two augers 56, 92 rather than one, the amount of cleaned crop material that can be output from the agricultural harvester 10 can be increased. The cleaned crop material is supplied to the crop material elevator 60 from, for example, the clean grain auger 56 into the boot portion 78 due to gravity. As the crop material falls into the boot portion 78, the paddles 88 descend from the top 90 of the housing 74 on a return side 94 of the housing 74 toward the boot portion 78, where the paddles 88 will sweep up crop material to raise toward the top 90 of the housing 74 on a conveyance side 96 of the housing 74 that is opposite the return side 94. In other words, the paddles 88 rotate in a counter-clockwise direction, which is designated by arrow 98, through the housing 74 due to the driving loop 84 being rotated by the sprockets 86 about the axis of rotation A1. As the paddles 88 are carried through the boot portion 78 by the driving loop 84, the paddles 88 come into contact with the cleaned crop material and begin to lift the cleaned crop material toward the top 90 of the housing 74. During this time, the paddles 88 experience peak loads due to maximal acceleration forces.

To lower the peak load that the paddles 88, and thus the driving loop 84, experience during the cleaned crop material's maximum acceleration forces, the boot portion 78 of the housing 74 is modified so that the boot portion 78 defines a bulbous shape on the conveyance side 96 of the housing 74, which can be seen in FIGS. 3-4. As used herein, "bulbous" refers to the boot portion 78 radially widening, relative to the axis of rotation A1, from a bottom 104 of the boot portion 78 toward the top 90 of the housing 74 before radially narrowing to the width of a main portion 100 of the housing 74 that has a width which leaves little, if any, clearance (minimum distance) between lateral sides 102 of the main portion 100 and the paddles 88 as the paddles 88 ascend and descend through the housing 74. If desired, the boot portion 78 can be formed to also have a bulbous shape on the return side 94 of the housing 74. To form the bulbous shape, the boot portion 78 can have the bottom 104 defining a bottom arc relative to the axis of rotation A1, a protruding portion 106 defining a protruding arc relative to the axis of rotation A1 that is continuous with the bottom 104, and a return portion 108 continuous with the protruding portion 106 that connects the boot portion 78 to the main portion 100 of the housing 74 and can return the width of the boot portion 78 back to the width of the main portion 100. Since the bottom 104 of the boot portion 78 is where the paddles 88 will mostly transition from their downward movement to upward movement, the bottom arc defining the shape of the bottom 104 can have a bottom arc length L1 that is relatively larger than a protruding arc length L2 of the protruding portion 106 and a return arc length L3 of the return portion 108. Relative to the axis of rotation A1, the bottom arc length L1 can define an end-to-end degree measurement $\alpha 1$ relative to the axis of rotation A1 between 90 to 110 degrees, whereas the end-to-end degree measurement $\alpha 2$ of the protruding arc length L2 relative to the axis of rotation A1 can be between 40 and 60 degrees. In this sense, the bottom arc defining the shape of the bottom 104 can have a lower degree of curvature, defined by the end-to-end degree measurement $\alpha 1$ divided by the bottom arc length L1, compared to the protruding portion 106 with a degree of curvature defined by the end-to-end degree measurement $\alpha 2$ divided by the protruding arc length L2.

Figure 5:
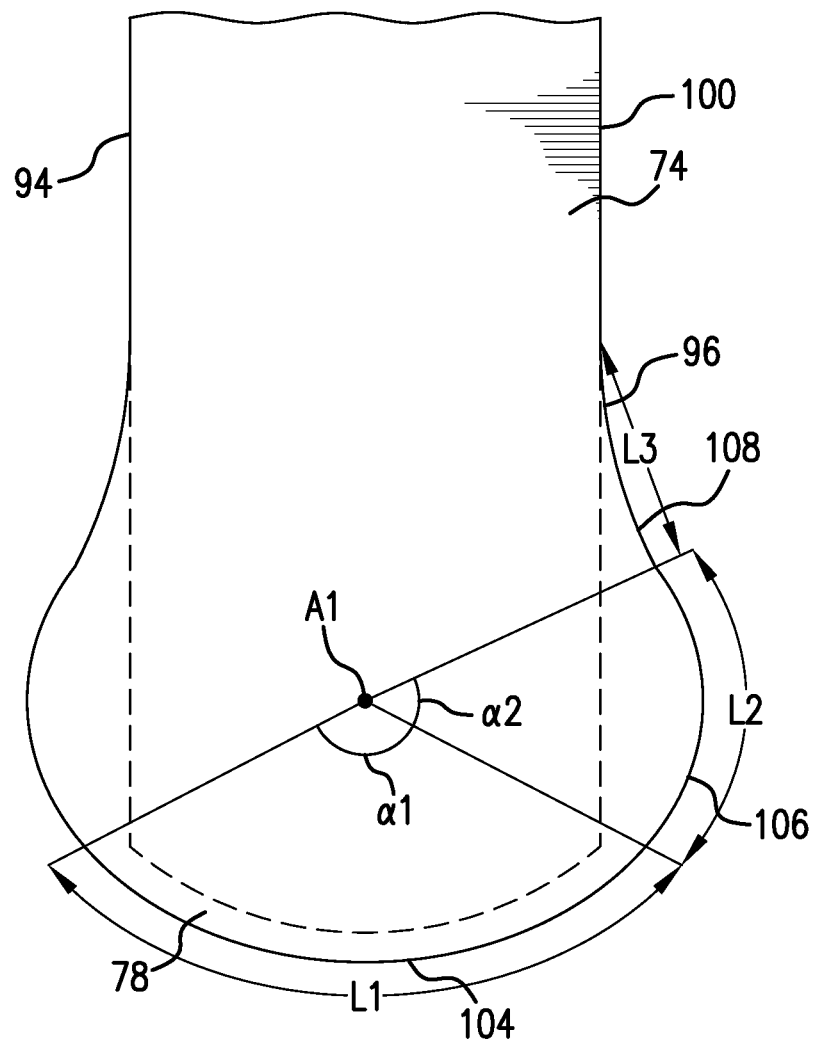
FIG. 5 is a rear view of the crop material elevator shown in FIGS. 1-4 with a shape of a prior art elevator housing illustrated in dashed lines for comparison.

Referring now to FIG. 5, the housing 74 of the crop material elevator 60 with modified boot portion 78 is shown with an example prior art elevator housing boot portion illustrated in dashed lines for comparison. As can be seen, the prior art elevator boot portion defines a single arc at its bottom. The shown embodiment of the housing 74 formed according to the present invention, however, has the protruding portion 106 and return portion 108 that also define arcs extending outwardly then inwardly from the bottom 104 toward the top 90. This shape not only widens the boot portion 78, but allows cleaned crop material to come off the paddles 88 while the paddles 88 experience maximum acceleration and into the protruding portion 106. The cleaned crop material can then travel along the wall of the protruding portion 106 to the return portion 108, which directs the crop material back toward the path of the paddles 88 carried by the driving loop 84. As the crop material travels along the protruding portion 106 and return portion 108, the crop material can decelerate due to gravity so that the crop material re-enters the path of the paddles 88 from the return portion 108 going approximately the same speed as the paddles 88, reducing the peak load transmitted through the paddles 88 to the driving loop 84 when the paddles 88 contact the cleaned crop material. The paddles 88 can then carry the cleaned crop material through the main portion 100 of the housing 74 toward the top 90 of the housing 74.

Figure 6:
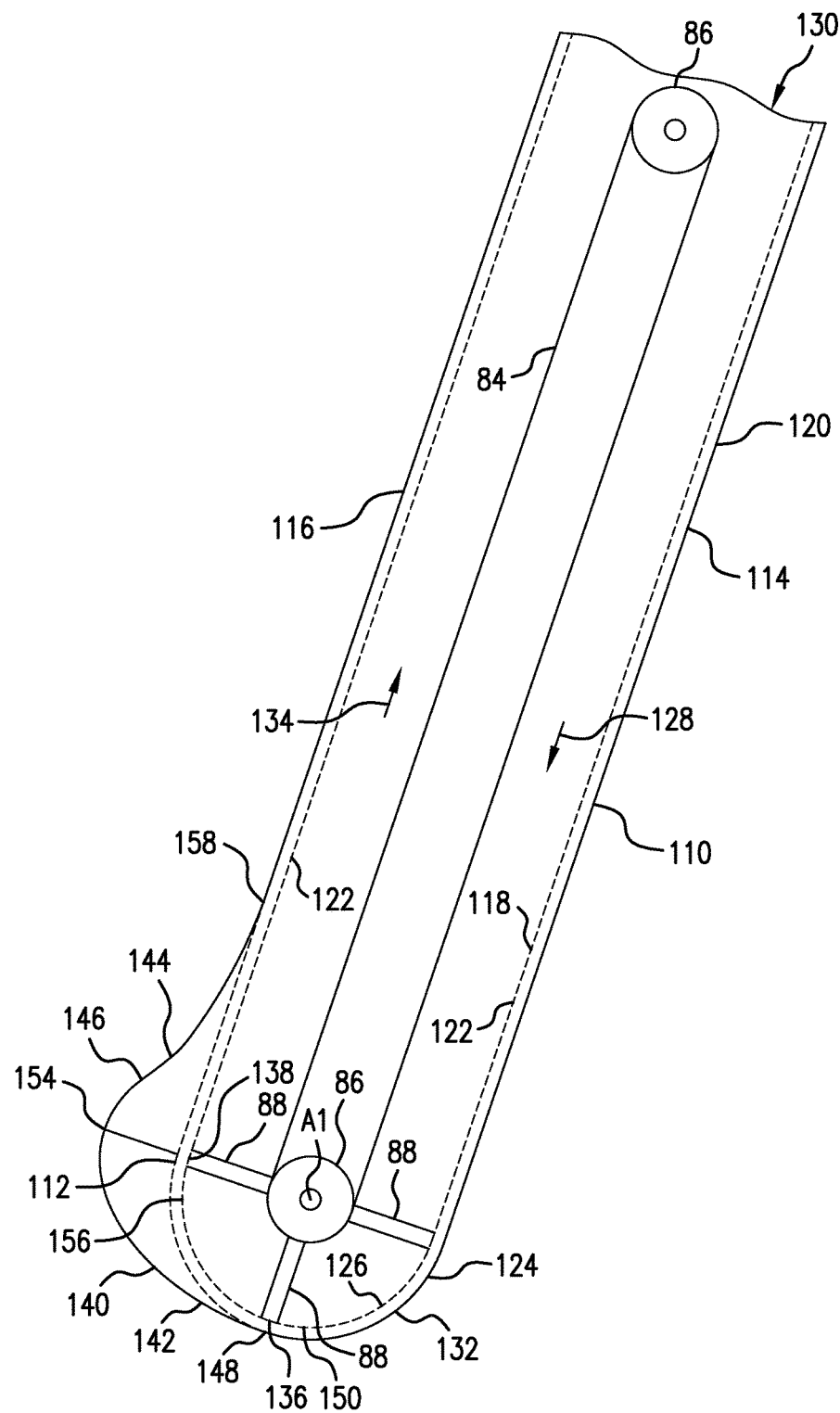
FIG. 6 is a sectional view of another embodiment of an elevator housing according to the present invention with a shape of a prior art elevator housing illustrated in dashed lines for comparison.

Referring now to FIG. 6, another embodiment of a housing 110 that can be incorporated in the crop material elevator 60 is shown with a shape of a prior art boot portion being drawn in a series of dashed lines designated as reference number 112. As can be seen, the housing 110 can have a return side 114 and a conveyance side 116 opposite the return side 114, corresponding to where the paddles 88 are travelling. To better illustrate the relative motion of the paddles 88 within the housing 110, a travel path of the paddles 88 as they are carried by the driving loop 84 is illustrated as a series of dashed lines designated as reference number 118. The housing 110 can have a main portion 120 which has little clearance between its walls and the paddles 88 and where the paddles 88 have a linear motion, which can also be referred to as a linear component 122 of the travel path 118. The housing 110 can also have a boot portion 124 where the paddles 88 have a rotational motion, which can also be referred to as a rotational component 126 of the travel path 118. As used herein, the linear component 122 of the travel path 118 refers to the portion of the travel path 118 where the driving loop 84 is carrying the paddles 88 in a relatively straight line. It should be appreciated that the paddles 88 can still rotate as they are carried through the linear component 122 of the travel path 118 due to the effects of forces acting on a paddle 88 causing a relative rotation between the paddle 88 and the driving loop 84, but these rotational movements will generally be negligible compared to the movement of the paddles 88 in a linear direction. Further, since the driving loop 84 carrying the paddles 88 rotates about the axis of rotation A1, the rotational component 126 of the travel path 118 can be defined about the axis of rotation A1. On the return side 114 of the housing 110, the paddles 88 are generally moving in a downward vertical direction, designated as arrow 128, from a top 130 of the housing 110 toward a bottom 132. On the conveyance side 116 of the housing 110, the paddles 88 are generally moving in an upward vertical direction, designated as arrow 134, from the bottom 132 of the housing 110 toward the top 130. The paddles 88 can therefore transition from moving in the downward vertical direction 128 to the upward vertical direction 134 at a vertical transition point 136 in the travel path 118, i.e., on either side of the vertical transition point 136 in the travel path 118, the paddles 88 are generally moving in only one vertical direction. After the vertical transition point 136, the paddles 88 can transition from the rotational component 126 of the travel path 118 back to the linear component 122 of the travel path 118 at a linear transition point 138 in the travel path 118.

As can be seen, the housing 110 has a region of divergence 140 where a minimum distance (clearance) between a housing wall 142 of the region of divergence 140 and the driving loop 84 is increasing and a region of convergence 144 where a minimum distance (clearance) between a housing wall 146 of the region of convergence 144 and the driving loop 84 is decreasing. The region of divergence 140, as shown, can have a beginning 148 where the housing wall 142 starts to increase in clearance from the driving loop 84 and is adjacent to the vertical transition point 136 in the travel path 118. In other words, the clearance between the housing wall 142 and the driving loop 84 can begin to increase at a point in the region of divergence 140 that is aligned with the vertical transition point 136 perpendicularly to the axis of rotation A1, with the clearance between the housing wall 142 and the driving loop 84 continuing to increase further along the travel path 118 of a paddle 88 carried by the driving loop 84. In such a case, the clearance between the housing wall 142 and the driving loop 84 increases as the paddle 88 is in the rotational component 126 of the travel path 118 traveling in the upward vertical direction 134. However, it is not necessary that the beginning 148 of the region of divergence 140 and the vertical transition point 136 are aligned; the region of divergence 140 can have a beginning that is aligned with a point in the rotational component 126 of the travel path 118 slightly earlier or later than the vertical transition point 136. Such a point can be located in the travel path 118 up to 10 degrees of rotation about the axis of rotation A1 from the vertical transition point 136, such as point 150.

Comparing the shape of the region of divergence 140 to the illustrated prior art boot portion 112, it can be seen that whereas the clearance between the housing wall 142 and driving loop 84 is constantly increasing, a clearance between the driving loop 84 and the prior art boot portion 112 is essentially constant. The region of divergence 140 therefore allows cleaned crop material contacted by the paddles 88 to escape off a leading edge of a paddle 88 toward the housing wall 142 at points in the travel path 118 where the acceleration of the paddle 88 is greatest. If desired, the region of divergence 140 can widen to increase the clearance between the housing wall 142 and the driving loop 84 along an entirety of the region of divergence 140 in one of the vertical directions, such as upward vertical direction 134. Further, the region of divergence 140 can widen to increase the clearance between the housing wall 142 and the driving loop 84 to any desired amount.

After the region of divergence 140, in a direction of the travel path 118, the region of convergence 144 begins. As can be seen, the region of convergence 144 is the opposite of the region of divergence 140 in that a clearance between the housing wall 146 of the region of convergence 144 and the driving loop 84 decreases. The region of convergence 144 can be continuous with the region of divergence 140, as shown, so that the clearance between the housing 110 and the driving loop 84 increases in the region of divergence 140 before immediately decreasing in the region of convergence 144. The region of convergence 144 can have a beginning 154 that is adjacent with the linear transition point 138 so that as the paddles 88 begin to transition from the rotational component 126 of the travel path 118 to the linear component 122 of the travel path 118, the clearance between the housing wall 146 of the region of convergence 144 and the driving loop 84 begins to decrease. Similarly to the beginning 148 of the region of divergence 140, the beginning 154 of the region of convergence 144 can be aligned with a point in the travel path 118 up to 10 degrees of rotation about the axis of rotation A1 from the linear transition point 138, such as point 156. As shown, the beginning 148 of the region of divergence 140 and the beginning 154 of the region of convergence 144 are separated by approximately 90 degrees of rotation about the axis of rotation A1, but can be separated by between 75 to 115 degrees of rotation about the axis of rotation A1. Past the beginning 154 of the region of convergence 144, the clearance between the housing 110 and the driving loop 84 can decrease to an end 158 of the region of convergence 144 connected to the main portion 120 of the housing 110, where there is little clearance between the driving loop 84 and the housing 110.

It should therefore be appreciated that after cleaned crop material has been flung off the paddles 88 toward the region of divergence 140 of the housing 110, the crop material can flow along the housing wall 142 of the region of divergence 140 away from the driving loop 84 until reaching the beginning 154 of the region of convergence 144 to flow along the housing wall 146 of the region of convergence 144 toward the driving loop 84. As the crop material flows along the housing walls 142 and 146, the crop material decelerates due to gravity as it flows toward the end 158 of the region of convergence 144, where it can flow back onto a paddle 88 for conveyance toward the top 130 of the housing 110.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural harvester, comprising:
   a chassis;
   a cleaning system carried by said chassis and configured to clean crop material; and
   a crop material elevator carried by said chassis and supplied with cleaned crop material from said cleaning system, said crop material elevator including:
      a housing including a return side, a conveyance side, and side walls between the return and conveyance sides, the housing further including a boot portion at a bottom of said housing, said boot portion defining a bulbous shape on the conveyance side of said housing;
      a driving loop held within said housing and configured to rotate about an axis of rotation;
      a driving element linked to said driving loop and configured to rotate said driving loop; and
      a plurality of paddles carried by said driving loop;
      wherein the plurality of paddles are rotated towards the boot portion on the return side of the housing and away from the boot portion on the conveyance side of the housing; and
      wherein the bulbous shape includes a radial widening of the conveyance side of the housing uniformly extending from the axis of rotation between the side walls of the housing.

2. The agricultural harvester according to claim 1, wherein said driving element rotates about the axis of rotation, said boot portion defining a bottom arc relative to said axis of rotation, a protruding arc relative to said axis of rotation that is continuous with said bottom arc, and a return arc that is continuous with said protruding arc.

3. The agricultural harvester according to claim 2, wherein said housing includes a main portion, said return arc of said boot portion connecting to said main portion.

4. The agricultural harvester according to claim 2, wherein said bottom arc has a lower degree of curvature than said protruding arc.

5. The agricultural harvester according to claim 2, wherein said return arc has a lower degree of curvature than said protruding arc.

6. The agricultural harvester according to claim 2, wherein said protruding arc defines an arc curvature of between 40 and 60 degrees relative to said axis of rotation.

7. The agricultural harvester according to claim 1, wherein said boot portion defines a bulbous shape on said conveyance side and a return side of said housing.

8. A crop material elevator, comprising:
   a housing including a return side, a conveyance sides, and side walls between the return and conveyance sides, the housing further including a boot portion at a bottom of said housing, said boot portion defining a bulbous shape on the conveyance side of said housing;
   a driving loop held within said housing and configured to rotate about an axis of rotation;
   a driving element linked to said driving loop and configured to rotate said driving loop; and
   a plurality of paddles carried by said driving loop;
   wherein the plurality of paddles are rotated towards the boot portion on the return side of the housing and away from the boot portion on the conveyance side of the housing; and
   wherein the bulbous shape includes a radial widening of the conveyance side of the housing uniformly extending from the axis of rotation between the side walls of the housing.

9. The elevator according to claim 8, wherein said driving element rotates about the axis of rotation, said boot portion defining a bottom arc relative to said axis of rotation, a protruding arc relative to said axis of rotation that is continuous with said bottom arc, and a return arc that is continuous with said protruding arc.

10. The elevator according to claim 9, wherein said housing includes a main portion, said return arc of said boot portion connecting to said main portion.

11. The elevator according to claim 9, wherein said bottom arc has a lower degree of curvature than said protruding arc.

12. The elevator according to claim 9, wherein said return arc has a lower degree of curvature than said protruding arc.

13. The elevator according to claim 9, wherein said protruding arc defines an arc curvature of between 40 and 60 degrees relative to said axis of rotation.

14. The elevator according to claim 8, wherein said boot portion defines a bulbous shape on two opposite sides of said housing.

15. An agricultural harvester, comprising:
   a chassis;
   a cleaning system carried by said chassis and configured to clean crop material; and
   a crop material elevator carried by said chassis and supplied with cleaned crop material from said cleaning system, said crop material elevator including:
      a driving loop configured to rotate about an axis of rotation;
      a driving element linked to said driving loop and configured to rotate said driving loop;
      a plurality of paddles carried by said driving loop, said plurality of paddles each being carried by said driving loop to define a travel path with a rotational component that transitions into a linear component; and
      a housing at least partially surrounding said driving loop and said plurality of paddles, said housing having a region of divergence relative to said driving loop adjacent to said rotational component of said travel path and a region of convergence relative to said driving loop adjacent to said linear component of said travel path, said housing including a return side, a conveyance side, and side walls between the return and conveyance sides, and said housing including a boot portion defining a bulbous shape on the conveyance side of the housing;
      wherein the plurality of paddles are rotated towards the boot portion on the return side of the housing and away from the boot portion on the conveyance side of the housing; and wherein the bulbous shape includes a radial widening of the conveyance side of the housing uniformly extending from the axis of rotation between the side walls of the housing.

16. The agricultural harvester according to claim 15, wherein said region of divergence is adjacent to said rotational component of said travel path where each of said plurality of paddles travels in one vertical direction.

17. The agricultural harvester according to claim 15, wherein said region of divergence has a beginning adjacent to a vertical transition point in said travel path.

18. The agricultural harvester according to claim 15, wherein said region of divergence widens across its entirety in a vertical direction.

19. The agricultural harvester according to claim 15, wherein said region of convergence narrows across its entirety in a vertical direction.

20. The agricultural harvester according to claim 15, wherein said region of divergence has a divergence beginning, said region of convergence has a convergence beginning, and said rotational component of the travel path is defined about an axis of rotation, said divergence beginning and said convergence beginning being separated by 75 to 115 degrees of rotation about said axis of rotation.

* * * * *